United States Patent
Dayan et al.

(10) Patent No.: US 7,251,736 B2
(45) Date of Patent: Jul. 31, 2007

(54) REMOTE POWER CONTROL IN A MULTI-NODE, PARTITIONED DATA PROCESSING SYSTEM VIA NETWORK INTERFACE CARDS

(75) Inventors: Richard Alan Dayan, Wake Forest, NC (US); Gregory Brian Pruett, Raleigh, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 10/603,538

(22) Filed: Jun. 25, 2003

(65) Prior Publication Data

US 2004/0268111 A1    Dec. 30, 2004

(51) Int. Cl.
*G06F 1/26* (2006.01)
*G06F 1/32* (2006.01)
*G06F 15/177* (2006.01)
*G06F 15/80* (2006.01)

(52) U.S. Cl. .............................. 713/310; 713/1; 713/2; 713/300; 713/320; 709/217; 709/219; 709/220; 709/222

(58) Field of Classification Search .................... None
See application file for complete search history.

(56) References Cited

U.S. PATENT DOCUMENTS

| 5,802,305 | A  | * | 9/1998  | McKaughan et al. ....... 713/310 |
| 5,809,313 | A  |   | 9/1998  | Gianni |
| 6,047,378 | A  |   | 4/2000  | Garrett et al. |
| 6,052,779 | A  |   | 4/2000  | Jackson et al. |
| 6,311,276 | B1 |   | 10/2001 | Connery et al. |
| 6,405,259 | B1 | * | 6/2002  | Cheston et al. ............. 709/245 |
| 6,421,782 | B1 |   | 7/2002  | Yanagisawa et al. |

* cited by examiner

*Primary Examiner*—James K. Trujillo
(74) *Attorney, Agent, or Firm*—Joseph P. Lally; Cynthia Byrd

(57) ABSTRACT

A system and method for remote power control across multiple distinct nodes of a logically coherent data processing system where each node has the design of a traditional standalone SMP server. The system is partitioned into two or more static partitions. Remote power control for the partition is achieved using a modified wake-on-LAN implementation in which magic packet filters on each NIC in the partition are modified to enable remote, partition-wide restart by a magic packet that is recognized by or common to all of the nodes. In one embodiment the wake-on-LAN filters of each NIC in the partition recognize and respond to magic packets addressed to any of the NIC's in the partition. In another embodiment, the wake-on-LAN filters of each NIC in the partition are modified to respond to a universal magic packet.

15 Claims, 3 Drawing Sheets

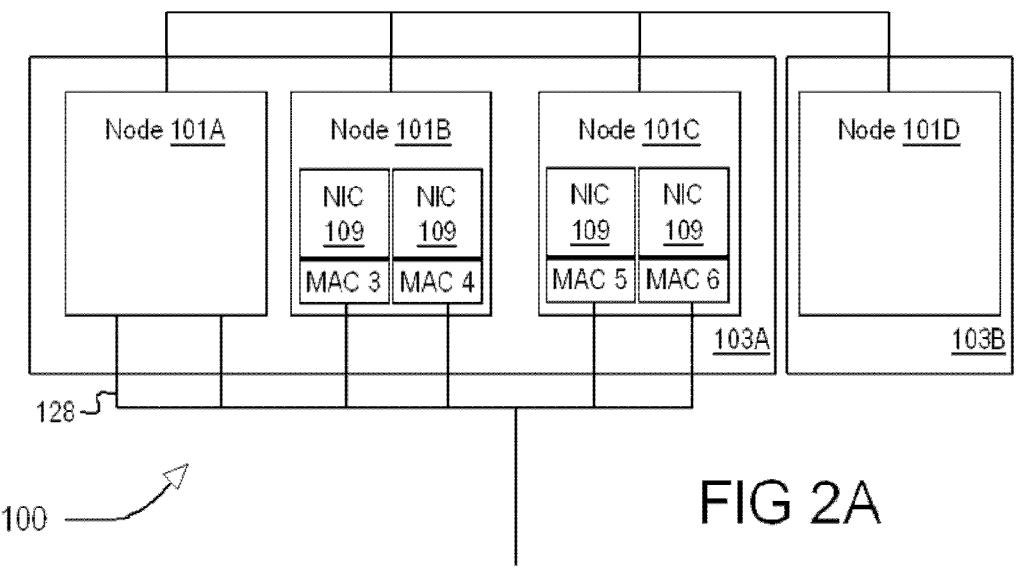
FIG 2A
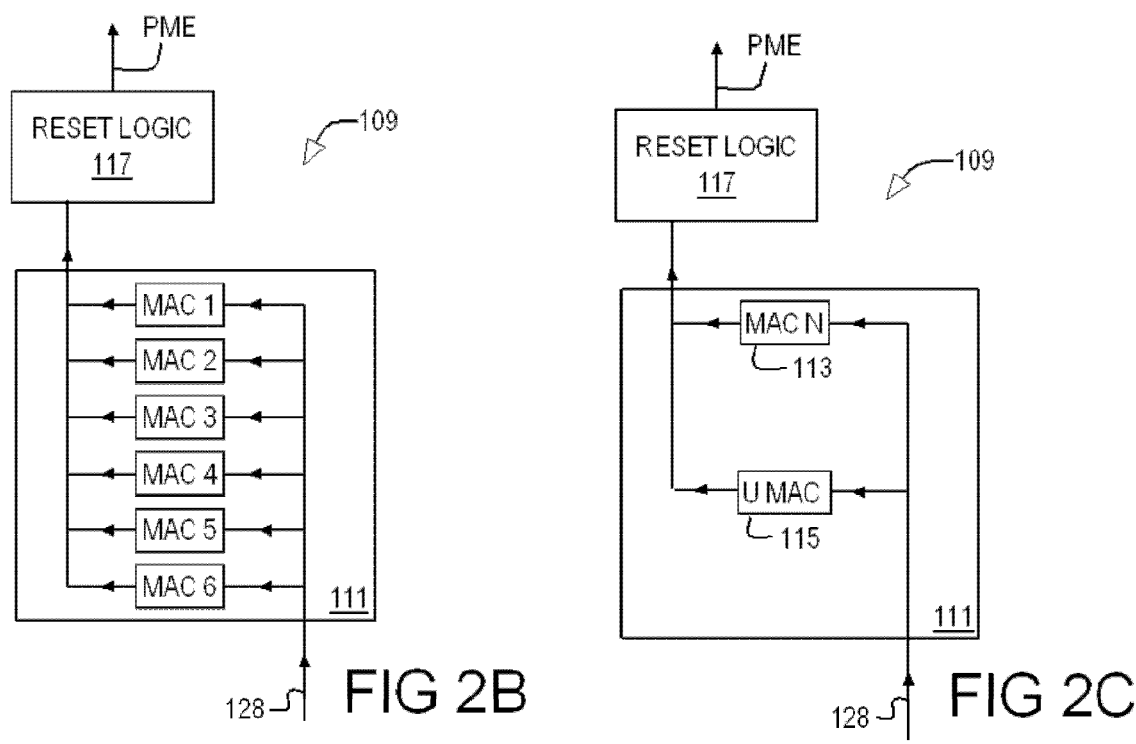
FIG 2B
FIG 2C

REMOTE POWER CONTROL IN A MULTI-NODE, PARTITIONED DATA PROCESSING SYSTEM VIA NETWORK INTERFACE CARDS

BACKGROUND

1. Field of the Present Invention

The present invention generally relates to the field of data processing systems and more particularly to resetting or powering up logically partitioned, multi-node, data processing systems.

2. History of Related Art

In data processing systems generally and standalone server systems more particularly remote power control has been achieved by using a wake-on-LAN (WOL) feature or dedicated service processor to provide an out-of-band method for remotely powering the system. This approach was logical and simple because there was a one-to-one correspondence between the dedicated service processor or network interface card (NIC), for example, and the "system," which consisted of one or more processors sharing a single set of resources (memory, I/O devices, etc.) within a single chassis. More recently, however, manufacturers have been redefining the architecture of stand-alone server systems to enable greater scalability and performance. The Enterprise X Architecture (EXA) from IBM Corporation, for example, is a scalable technology that enables a customer to combine multiple server "nodes" into a logically integrated unit that shares the resources of the combined system. Using this architecture, four nodes, each of which is a four-way symmetric multiprocessor (SMP) system are logically integrated to provide a 16-way super system that shares all the memory and I/O resources of the individual nodes. Moreover, this multi-node system can then be logically partitioned into two or more logical systems. The 16-way SMP system, for example, may be logically partitioned into two static partitions (SPARs) including a 3-node (12-way) SPAR running a Unix environment and a 1-node (4-way) SPAR running Windows®. Once the partition configuration is achieved, the system can be configured to be booted as multiple independent partitions.

While this ability to scale and logically partition individual server systems enables customers to manage their information technology investment by paying only for the processing capabilities currently needed, this type of scalable architecture does introduce complexities not found in conventional, standalone machines. Remote power management, for example, has traditionally been achieved using a WOL procedure or a dedicated service processor that provides an out-of-band method for remotely powering on the system. In a multi-node, statically partitionable architecture, however, the "system" may span multiple physical nodes, each with separate power control switches, separate network interface cards (NICs) and separate BIOS and POST code. With traditional standalone server implementations, traditional power control via WOL or a service processor network can only restore power on a single node. Multi-node, partitioned architectures, however, may require simultaneous restoration of system power to multiple nodes. It would be desirable, therefore, to provide a system and method for remote power control on a multi-node, partitionable architecture.

SUMMARY OF THE INVENTION

The problem identified above is addressed according to the present invention by a system and method for NIC-based remote power control across multiple nodes of a logically distinct data processing system. The system includes one or more nodes, each node including a chassis housing a traditional SMP server. The system may be partitioned into two or more SPAR's. Remote power control for the entire partition is achieved using a modified WOL implementation in which partition management software configures magic packet filters on each NIC in the partition to enable remote, partition-wide restart. In one embodiment suitable for its compatibility with existing management software, partition management software configures WOL filters of each NIC in the partition to recognize and respond to magic packets directed to any of the NIC's in the partition. In another embodiment suitable for its ability to selectively restart individual nodes in addition to its partition wide restart capability, the WOL filters of each NIC in the partition are modified to respond to a universal magic packet. In this embodiment, each NIC responds to two WOL packets, one containing the universal MAC address and one containing the NIC's individual MAC address. By modifying the network devices for each node in a partition, the invention enables remote power control over a system that comprises physically distinct nodes.

BRIEF DESCRIPTION OF THE DRAWINGS

Other purposes and advantages of the invention will become apparent upon reading the following detailed description and upon reference to the accompanying drawings in which:

FIG. 2A is a block diagram of selected elements of the data processing network of FIG. 1 emphasizing partition boot features of the present invention;

FIG. 2B is a conceptual illustration of selected elements of the partition boot features of the data processing network of FIG. 2A according to a first embodiment;

FIG. 2C is a conceptual illustration of selected elements of the partition boot features of the data processing network of FIG. 2A according to a second embodiment.

Figure 1:
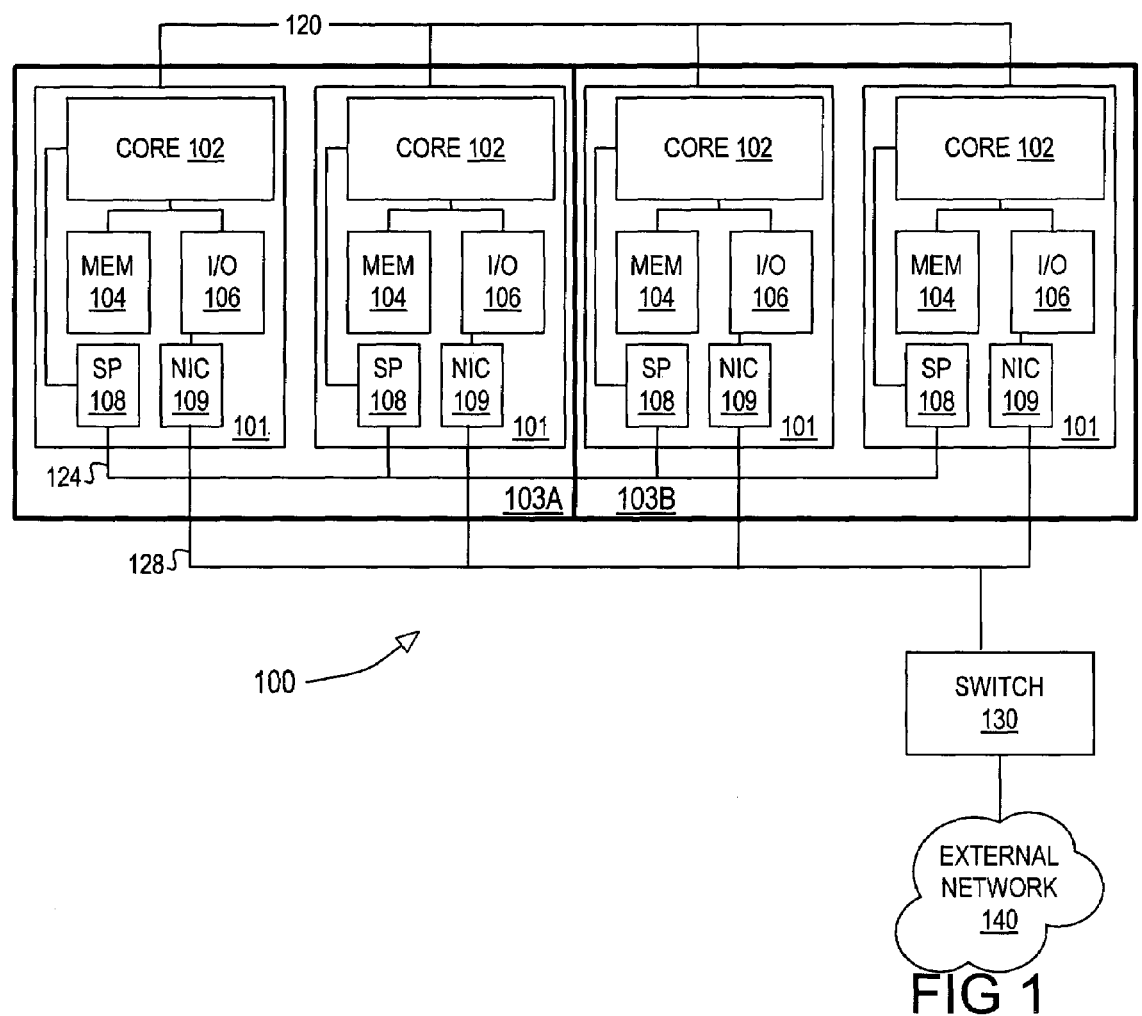
FIG. 1 is a block diagram of selected elements of a data processing network suitable for implementing one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention encompasses a method and system for enabling remote power management in a multi-node partitioned architecture using the network interface devices in each node. The system includes multiple physical nodes connected by an interconnect network referred to herein as a scalability link. The multi-node system may be partitioned into two or more partitions, where each partition may span the boundaries between different physical nodes. When the partition is initially configured, partition management code modifies the NIC's on each node to respond to a common WOL magic packet or to respond to a common set of WOL magic packets such that, when one of the common magic packets is sent to the partition, each NIC within the partition responds with a power reset thereby achieving simultaneous activity.

Turning now to the drawings, FIG. 1 illustrates selected elements of a data processing system 100 suitable for use with the present invention. In the depicted embodiment, system 100 includes a set of four interconnected nodes 101. Each node 101 has its own chassis and includes a central processing core 102, system memory 104, and I/O devices collectively represented in FIG. 1 by reference numeral 106. Each core 102 may include multiple microprocessor devices that share the system memory 104 such that each node 101 is suitable for use as a symmetrical multiprocessor (SMP) system. I/O 106 includes, for example, any fixed or direct access storage device (DASD) the node may include. The core 102, system memory 104, and I/O 106 may be implemented as a scalable server system such as, for example, the xSeries x440 server from IBM Corporation. In one particular embodiment that illustrates the scalability of system 100, each node 101 includes a core 102 with four x86-type microprocessors. In this implementation, four nodes 101 can be merged to form a 16-way SMP system or partition that enjoys the benefits of combined resources while overcoming limitations (such as system bus bandwidth) that limit the scalability of conventional (i.e., single node) SMP configurations.

Each node 101 as depicted in FIG. 1 includes service processor facilities 108 that enable functionality including graphical console redirection, keyboard and mouse control, remote management independent of the server status, and remote control of hardware and operating systems. Service processor 108 also enables remote update of the server's firmware (including the firmware of the supervisory facilities themselves). In one embodiment, service processor 108 is implemented as an adapter that is connected via a PCI or other suitable I/O bus. An example of this type of service processor facility is the Remote Supervisory Adapter (RSA) from IBM Corporation.

In the scalable partition embodiment referred to above, system 100 is implemented in a merged resource configuration. In this configuration, the processing, memory, and I/O resources of each individual node 101 are shared by the system 100 as a whole to achieve scalable performance. Individual nodes 101 are interconnected with a scalability link 120 that makes the processing, memory, and I/O resources of each node available to the system 100 under a single operating system image. Scalability link 120 is a bi-directional high-speed link that connects the system busses of each node 101.

Moreover, the multi-node system 100 may be logically divided or partitioned into two or more virtual machines referred to herein as static partitions (SPAR's) identified by reference numerals 103A and 103B (generically or collectively referred to as SPAR(s) 103), each of which can run in its own environment. As depicted in FIG. 1, each partition 103 is a multi-node (i.e., multi-chassis) system operating under a single operating system image. The multiple physical nodes of the partition are transparent to application programs. In a partition configuration, some conventional I/O resources on some of the nodes may be eliminated. In one embodiment, for example, only one node of the partition requires and includes a keyboard, display monitor, mouse, and removable media disk drive.

As depicted in FIG. 1, service processors 108 of each node 101 communicate with each other via a link 124 that is sideband with respect to scalability link 120. In one embodiment, service processors 108 communicate via a standard 10/100 Ethernet link using IP protocols. Service processors 108 are suitable for tasks including powering a node's main power supply (the power provided to core 102 and memory 104) on and off. System 100 as depicted is connected to an external network 140 via a connection 128 and switch 130 that connects to a network interface card (NIC) 109 in each of node 101. Although FIG. 1 depicts a single NIC 109 for each node 101, nodes 101 may have two or more NIC's depending upon the implementation. Connection 128 permits partition 103 access to a larger network such as an enterprise intranet or the Internet.

Once a system is configured as one or more partitions 103, it is highly desirable to boot each partition as a single unit by executing a partition boot sequence following a reset on any of the individual nodes 101. During the partition boot sequence, each individual node 101 executes a portion of its own boot program before deferring control to the partition sequence. Following a reset, each node 101 within a partition 103 turns on its internal power supplies and performs its system BIOS including its power on self test (POST). The individual node boot sequences would then collectively defer to a designated primary node or boot node that would determine what system resources are present and configure the resources as a single group of resources that is available to application programs.

The partition boot sequence is complicated by the presence of multiple nodes. In a multi-node architecture, it is likely that the service processor on only a single node, referred to herein as the boot node, has information regarding the configuration of partition. The remaining service processors may lack any information about or knowledge of the partition configuration including which nodes comprise the partition making it difficult to achieve partition boot using conventionally employed service processors. The invention according to the present invention overcomes this hurdle by modifying the NIC's of each node to respond to a common WOL magic packet or to a common set of magic packets. If one of these common magic packets is delivered to partition 100, each NIC 109 in the partition will respond to the packet by initiating a system restart.

Referring now to FIG. 2A, a conceptual illustration of selected elements of system 100 according to the present invention is presented to emphasize the system's use of NIC's 109 to enable partition-wide reset in a multi node partition. As illustrated in FIG. 2, system 100 includes four nodes 101 that are configured as two partitions 103A and 103B. First partition 103A is a three-node partition including nodes 101A, 101B, and 101C while second partition 103B is a single node partition comprised of node 101D.

First partition 103A is a multi-node partition that includes a boot node 101A, and two subordinate nodes 101B, and 101C. System 100 may include partition management software responsible for configuring the partition(s) 103. Such partition management software may include, for example, portions of a System Partition Manager (SPM) in the Director product from IBM Corporation. IBM Director enables viewing and tracking of hardware configuration of remote systems in detail and monitoring of usage and performance of critical components, such as processors, disks, and memory. The first node 101A is designated as the boot node. The boot node executes the partition boot sequence following a reset to configure partition 103A in its multi-node configuration.

Partition 103A is enabled according to the present invention to initiate a partition boot sequence that resets each of its nodes 101 and then boots the nodes into a partition configuration. Importantly, the reset that initiates this partition boot sequence may be received by any of the nodes 101 in the partition. If a subordinate node such as node 101B receives the reset, that node likely has little or no information about the partition configuration (i.e., what nodes and resources are included in the partition). In the absence of a mechanism as described herein, the reset on subordinate node 101B (or 101C) would leave the partition in an undetermined state in which at least one node (boot node 101A) is operating under the assumption that the system is a multi-node partition, while another node (101B) has booted into a standalone configuration. According to the present invention however, an appropriate reset on node 101B via its NIC 109, or on any other partition node 101, boots all of the nodes 101 including the boot node 101A so that a complete partition boot sequence is performed to configure the partition each time regardless of where the boot sequence is initiated.

In the depicted embodiment, each node 101 in partition 103A includes a pair of NIC's 109 such that partition 103 includes a total of six NIC's 109. Each NIC 109 has its own unique numeric identifier. In an Ethernet embodiment, which represents the most widely implemented embodiment, the numeric identifier of each NIC 109 is referred to as the NIC's Media Access Control (MAC) address. Thus, the six NIC's 109 shown in FIG. 2A are indicated as having MAC addresses indicated by MAC 1, MAC 2, MAC 3, and so forth. In a conventional NIC implementation, each NIC responds only to network packets that are directed specifically to it. More specifically, NIC's 109 includes packet filters that determine which network packets are received by a NIC and by the absence of a network packet for a specific MAC address, those which are ignored by the NIC. In the context of the present invention, which is related to power resets, the network packets of interest are referred to as wake-on-LAN (WOL) packets, WOL magic packets, or simply magic packets. A magic packet in an Ethernet environment is a packet in which a particular MAC address is repeated sixteen (16) times. If a NIC receives a magic packet containing its MAC address, the logic on the NIC will assert a signal such as the PME signal that will be familiar to users of the x86 family of processors. The assertion of PME results in a processor reset that will reboot the node.

While highly useful in conventional network environments in which logical partitions do not span multiple nodes or chassis, the WOL feature as it is typically implemented represents a limitation in the context of a multi-node data processing system. In a multi-node system, only one of the nodes is typically configured with sufficient network topology information to make decision about which nodes to boot in response to some form of reset event. Thus, only one node is appropriate for initiating a partition boot sequence.

Unfortunately, existing management software does not encompass multi-node systems and is not likely to determine which of the nodes 101 of partition 103 is the partition's boot node. In the absence of this information, it is not known which system should be reset to initiate a partition boot. To address this problem, the embodiments of partition 103 shown in FIG. 2B, and FIG. 2C incorporate the use of one or more common MAC addresses that are shared among the nodes 101. When a WOL packet is received and the packet includes a MAC address that is one of the common set of MAC addresses, the magic packets will be selected by each of the NIC's within the partition such that each node 101 will reset regardless of the original targeted NIC identified in the magic packet. When all nodes 101 have been reset, it will be apparent that the boot node 101A will also be reset and that this will result in a partition boot sequence regardless of which node initiated the restart.

According to the present invention, when partition management software is configuring a partition 103, the software determines and records the MAC addresses of each NIC 109 in the partition 103. The partition management software then modifies the NIC filters to respond to a common set of MAC addresses. In the embodiment depicted in FIG. 2B, for example, a set of six common magic packet filters 111 is configured on each node 101 of partition 103. Each filter 111 filters the MAC address of one of the NIC's 109 in partition 103. Because each of the three nodes 101 includes a pair of NIC's 109 in the depicted embodiment, each NIC 109 is configured with a total of six magic packet filters 111. With the multiple magic packet filters 111 as depicted in FIG. 2B, each node 101 will respond to a WOL magic packet addressed to any node 101 in the partition. More specifically, a WOL packet on network 128 having a MAC address that is common to each of the nodes 101 in a partition will pass through magic packet filter 111 and invoke reset logic 117 to assert the PME signal or take some other action that will result in a system reset. This embodiment beneficially minimizes the impact on existing system management software, which can achieve a partition reset using the same reset command (including MAC address) used to achieve a system reset in a single node configuration.

In the embodiment depicted in FIG. 2C, each NIC 109 is configured with two magic packet filters 111, a first filter (MAC N) 113 corresponding to the MAC address of the NIC itself and the second filter (U MAC) 115 corresponding to a partition or universal MAC address. The universal MAC address is a fictitious MAC address generated by the partition management software at configuration time. With each of the nodes 101 configured to respond to a universally recognized MAC address (recognized by each NIC 109 in a partition 103), a magic packet containing the universal MAC address will result in a system reset of each node 101, including the boot node, thereby achieving a partition boot sequence. Although this embodiment implies modification to existing management software to make it aware of the universal MAC address, this embodiment beneficially enables the NIC-based partition boot sequence desired while maintaining the ability to selectively restart individual nodes.

Figure 3:
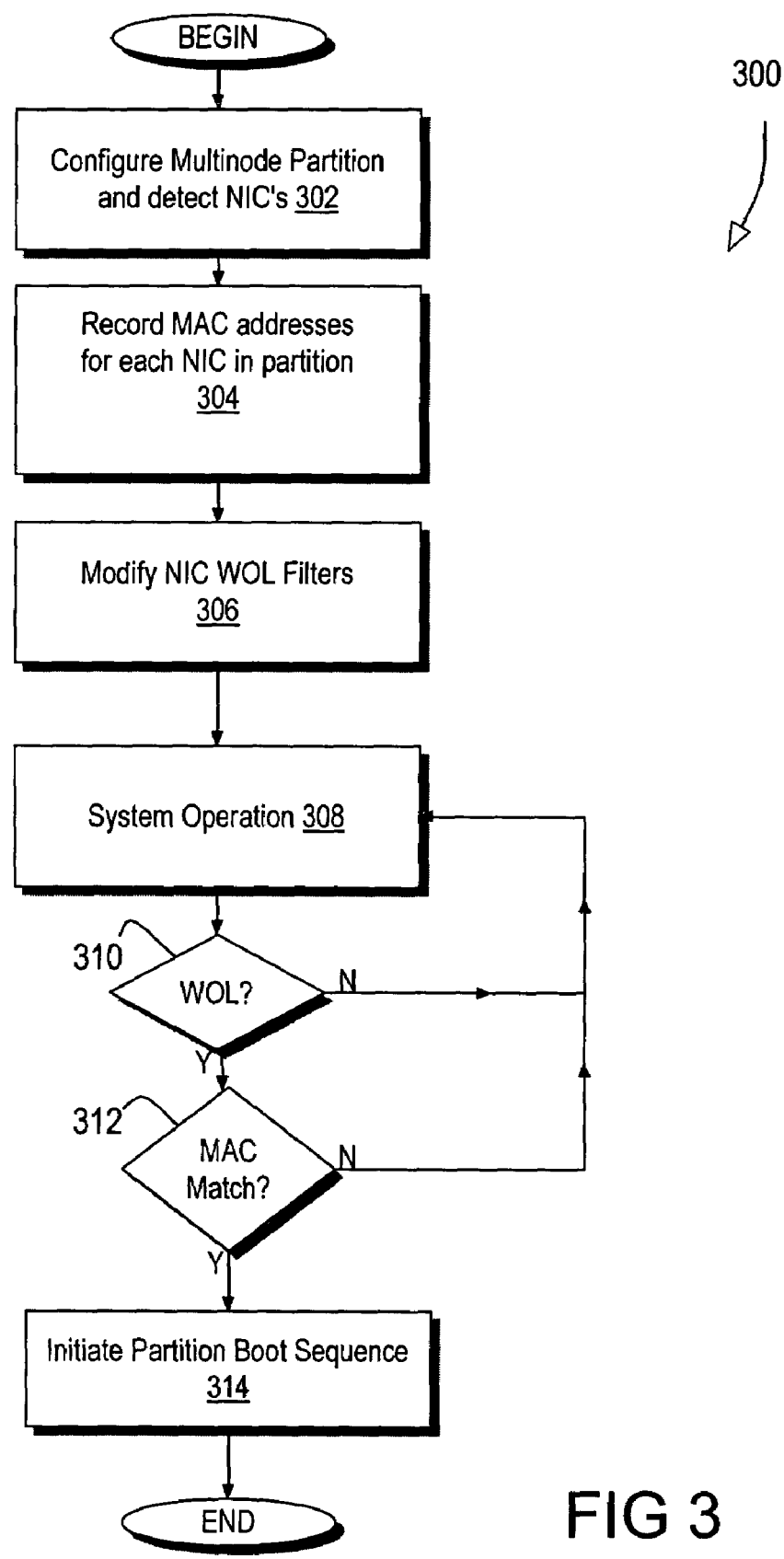
FIG. 3 is a flow diagram illustrating a method of booting a multi-node partition according to one embodiment of the present invention.

Referring now to FIG. 3, a flow diagram illustrates one implementation suitable for achieving remote power management control over a multi-node partition as described above. Portions of the invention are implemented as computer executable code (software) stored on a computer readable medium such as a hard disk, flash memory or other electrically erasable non-volatile memory, or in a volatile storage device such as system memory RAM or cache memory SRAM. When executed, this code may effect at least some of the elements represented in the flow diagram of FIG. 3.

As depicted in FIG. 3, a method 300 of remote power management in a multi-node, partitioned data processing system is depicted. The depicted embodiment of method 300 includes the configuration (block 302) of multiple nodes such as nodes 101 of FIG. 1 and FIG. 2 as a single machine partition through the use of partition management software and node connectivity hardware such as the scalability link 120. Once configured, partition 103 presents a single operating system image to its users and application programs. During partition configuration, the partition management software detects and records (block 304) each of the NIC's 109 of the various nodes 101 and their corresponding MAC addresses.

Following appropriate configuration, partition management software modifies (block 306) the WOL filters of each NIC 109 so that the set of NIC's 109 include at least one WOL filter that is common to all of the NIC's in the partition. The WOL filter modification may include creating, on each NIC, a set of WOL filters corresponding to the set of NIC's in the node as illustrated above in FIG. 2B. In other embodiments, the WOL filter modification may include the generation of a universal MAC address filter on each NIC in the partition as described above with respect to FIG. 2C.

Normal system operation following configuration of the partitions 103 and modifications of the WOL filters is indicated by block 308 with each partition running its own operating system and application program(s) while monitoring for a WOL request. Upon detecting a WOL request (block 310), the MAC address of the request is filtered against the MAC addresses in the WOL filters of each NIC. If the WOL MAC address matches (block 312) a MAC address that is common to the WOL filters on each of the NIC's, the reset is passed through to each of the nodes in the partition, including the boot node. The MAC address that matches a common MAC address may be the MAC address of any of the NIC's in the partition or it may be an artificial universal MAC address that is shared by all of the NIC's for reset purposes.

By resetting the each node 101, the WOL packet is guaranteed to reset the boot node of the partition 103. When the boot node is reset, the partition reset sequence is initiated (block 314) thereby assuring that the partition configuration is booted any time any of the individual nodes is booted. In this manner, the present invention further extends the partitioned concept to encompass not just the functional resources and the software image, but also the power management facilities of the individual nodes.

It will be apparent to those skilled in the art having the benefit of this disclosure that the present invention contemplates a method and system for booting each node in a multi-node partition. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A remote power management method for use in a multi-node data processing system, comprising:
   configuring the system to include at least one multi-node partition;
   determining a unique identifier associated with each network interface card (NIC) in the partition;
   based at least in part on the determined NIC identifiers, modifying wake-on LAN (WOL) filters of each NIC in the partition to include at least one WOL filter common to all of the NIC's in the partition, wherein a WOL packet corresponding to the at least one common WOL filter produces a reset on the corresponding node such that each partition node is reset in response to the WOL packet;
   wherein determining the unique identifier comprises determining the media access control (MAC) address of each NIC in the partition; and
   wherein modifying the WOL filters comprises including in each NIC a WOL filter corresponding to each of the determined MAC addresses such that a WOL packet addressed to any NIC in the partition is accepted by each NIC in the partition.

2. The method of claim 1, wherein determining an identifier includes creating a universal MAC address common to all NIC's in the partition.

3. The method of claim 2, wherein modifying the WOL filters comprises including a WOL filter corresponding to the universal MAC address on each NIC of the partition.

4. The method of claim 1, wherein configuring the system is further characterized as configuring the system to include at least one multi-node partition wherein at least one node in said partition comprises a symmetric multiprocessor having a set of processors and a system memory shared among the processors.

5. The method of claim 1, wherein configuring the nodes is further characterized as configuring the nodes to include a boot node and a set of subordinate nodes, wherein the boot node, when reset, is configured to boot all of the nodes into the partition configuration.

6. A data processing system, comprising:
   a plurality of nodes, each node comprising a symmetric multiprocessor system;
   means for configuring the plurality of nodes as at least one logical partition wherein each node is associated with one of the partitions; and
   a plurality of network interface cards (NIC's) with at least one NIC corresponding to each of the plurality of nodes, wherein each NIC includes at least one wake-on-LAN filter that is common to all of the NIC's in the partition wherein a WOL packet corresponding to the common WOL filter is accepted by each NIC in the partition there resetting each node in the partition;
   wherein each NIC in the partition comprises a plurality of WOL filters including a WOL filter corresponding to each NIC in the partition; and
   wherein the plurality of WOL filters include a WOL filter corresponding to the media access control (MAC) address of each NIC in the partition.

7. The system of claim 6, wherein the common WOL filter corresponds to a universal MAC address shared by each of the NIC's in the partition, wherein the universal MAC address is distinct from the MAC address of each of the NIC's.

8. The system of claim 6, wherein the WOL filter responds to a WOL packet comprising a recognized media access control (MAC) address repeated 16 times.

9. The system of claim 6, the means for configuring the nodes as logical partitions including:
   a bi-directional scalability link connecting each of the nodes in the system; and
   means for sharing resources of each node in the partition under a single operating system image.

10. The system of claim 6, wherein the nodes within each partition are further characterized as including a boot node and a set of subordinate nodes, wherein the boot node, when reset, is configured to boot all of the nodes into the partition configuration.

11. A computer program product comprising computer executable instructions, for remote power management in a multi-node data processing system, stored on a computer readable medium, comprising:

computer code means for configuring the system to include at least one multi-node partition;

computer code means for determining an identifier associated with each network interface card (NIC) in the partition; and computer code means for modifying, based at least in part on the determined NIC identifiers, wake-on LAN (WOL) filters of each NIC in the partition to include at least one WOL filter common to all of the NIC's in the partition, wherein a WOL packet corresponding to the at least one common WOL filter produces a reset on the corresponding node such that each partition node is reset in response to the WOL packet;

wherein determining the unique identifier comprises determining the media access control (MAC) address of each NIC in the partition; and wherein the code means for modifying the WOL filters comprises code means for including in each NIC a WOL filter corresponding to each of the determined MAC addresses such that a WOL packet addressed to any NIC in the partition is accepted by each NIC in the partition.

12. The computer program product of claim 11, wherein the code means for determining an identifier includes code means for creating a universal MAC address common to all NIC's in the partition.

13. The computer program product of claim 12, wherein the code means for modifying the WOL filters comprises code means for including a WOL filter corresponding to the universal MAC address on each NIC of the partition.

14. The computer program product of claim 11, wherein the code means for modifying the WOL filters comprises code means for including a WOL filter corresponding to the universal MAC address on each NIC of the partition, wherein the universal MAC address is distinct from the MAC address of each of the NIC's.

15. The computer program product of claim 11, wherein the code means for configuring the nodes is further characterized as code means for configuring the nodes to include a boot node and a set of subordinate nodes, wherein the boot node, when reset, is configured to boot all of the nodes into the partition configuration.

* * * * *